INVENTOR.
ELMER C. KIEKHAEFER
BY
ATTORNEY

INVENTOR.
ELMER C. KIEKHAEFER
BY
ATTORNEY

July 12, 1960     E. C. KIEKHAEFER     2,944,508
OUTBOARD MOTOR AND STARTING MEANS THEREFOR
Filed Sept. 14, 1955     7 Sheets-Sheet 4

INVENTOR.
ELMER C. KIEKHAEFER
BY
Steve W. Grembau
ATTORNEY

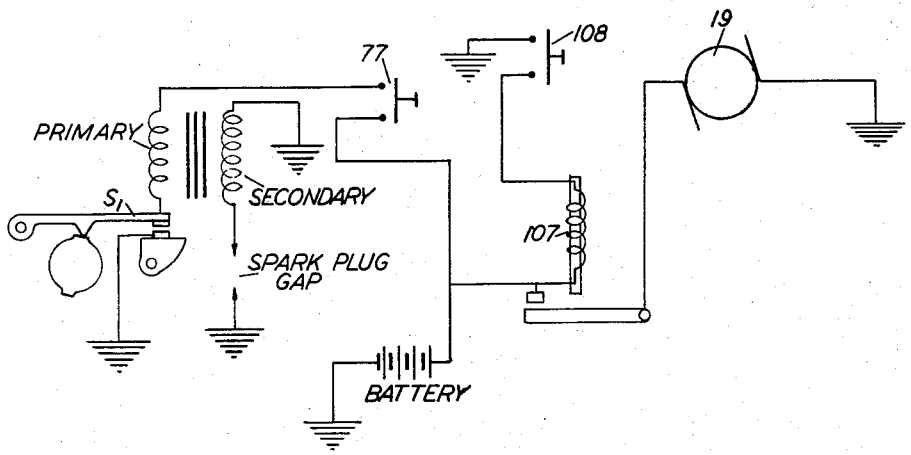
FIG. 8.
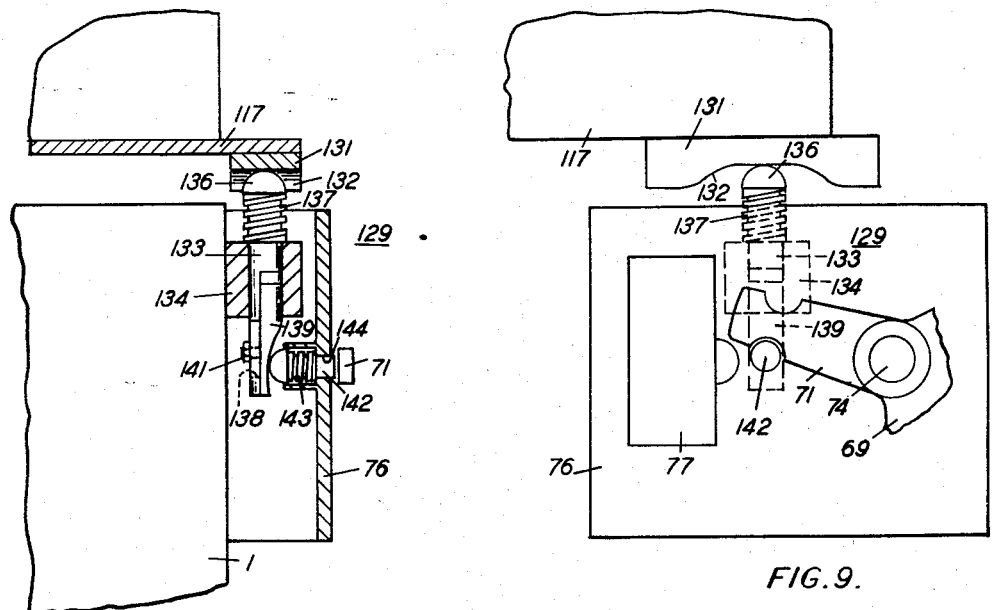
FIG. 10.
FIG. 9.
INVENTOR.
ELMER C. KIEKHAEFER
BY
ATTORNEY July 12, 1960  E. C. KIEKHAEFER  2,944,508
OUTBOARD MOTOR AND STARTING MEANS THEREFOR
Filed Sept. 14, 1955  7 Sheets-Sheet 6

INVENTOR.
ELMER C. KIEKHAEFER
BY
ATTORNEY

July 12, 1960 E. C. KIEKHAEFER 2,944,508
OUTBOARD MOTOR AND STARTING MEANS THEREFOR
Filed Sept. 14, 1955 7 Sheets-Sheet 7

INVENTOR.
ELMER C. KIEKHAEFER
BY
ATTORNEY

# United States Patent Office 2,944,508
Patented July 12, 1960

2,944,508

OUTBOARD MOTOR AND STARTING MEANS THEREFOR

Elmer Carl Kiekhaefer, 343 S. Washington St., Cedarburg, Wis.

Filed Sept. 14, 1955, Ser. No. 534,275

20 Claims. (Cl. 115—18)

This invention relates generally to starting mechanisms for internal combustion engines and more specifically to a starting mechanism for an outboard motor for positively rotating the crankshaft of the engine thereof in a clockwise or counter-clockwise direction for starting the engine in either direction.

Some of the novel features herein disclosed to be a part of the present invention are applicable to unidirectional engines as well as to engines of the reversible type. While the engine of Palmer disclosed in U.S. Patent No. 2,039,184 differs in many respects from the reversible engine here shown and described, reference is made to that patent as showing an engine of the general type having a crankshaft which is operable in either a clockwise or counterclockwise direction.

It is therefore an object of the present invention to provide an improved mechanism for positively rotating the crankshaft of an engine in either a clockwise or a counter-clockwise direction for starting same in either direction.

Another object of the invention is to provide an improved starting mechanism for an outboard motor that eliminates the need to crank the engine manually by means of a pull cord as is presently done.

Another object of the invention is the provision of mechanism for selectively connecting or disconnecting the engine ignition system and being provided with lost motion means wherein said connecting of the ignition is accomplished before the starter motor is moved by the mechanism into enagement with the driven pulley for starting the engine in either direction.

Another object of the invention is to provide an improved starter mehanism for actuating the ignition switch, moving the starter motor into contact with a driven pulley and starting the starter motor with one single movement of the starter lever.

Another object of the invention is the provision of lock means to prevent movement of the starting mechanism to shut off the enigne ignition when the engine is operating in excess of a predetermined rotational speed of the engine.

Another object of the invention is the provision of link mechanism for raising and lowering the starter motor with its axis at all times perpendicular to the axis of the crankshaft.

Another object of the invention is to provide means for maintaining the reverse lock mechanism in the locked position during reverse operation after the starter motor has been returned to a position out of engagement with the driven pulley.

Objects and advantages other than those set forth above will be apparent from the following description when read in connection with the accompanying drawing, in which:

Fig. 8 is a diagrammatic view of the ignition switch and starter motor switch circuitry;

Fig. 9 is an enlarged fragmentary elevation view showing a lock mechanism to prevent turning off the ignition switch when the engine is operating at a rotational speed above a predetermined value, shown at a time after the ignition is on and before the engine speed has reached the predetermined value;

Fig. 10 is a side elevation view of the structure shown in Fig. 9 with the ignition lock mechanism in the unlocked position;

Figure 1:
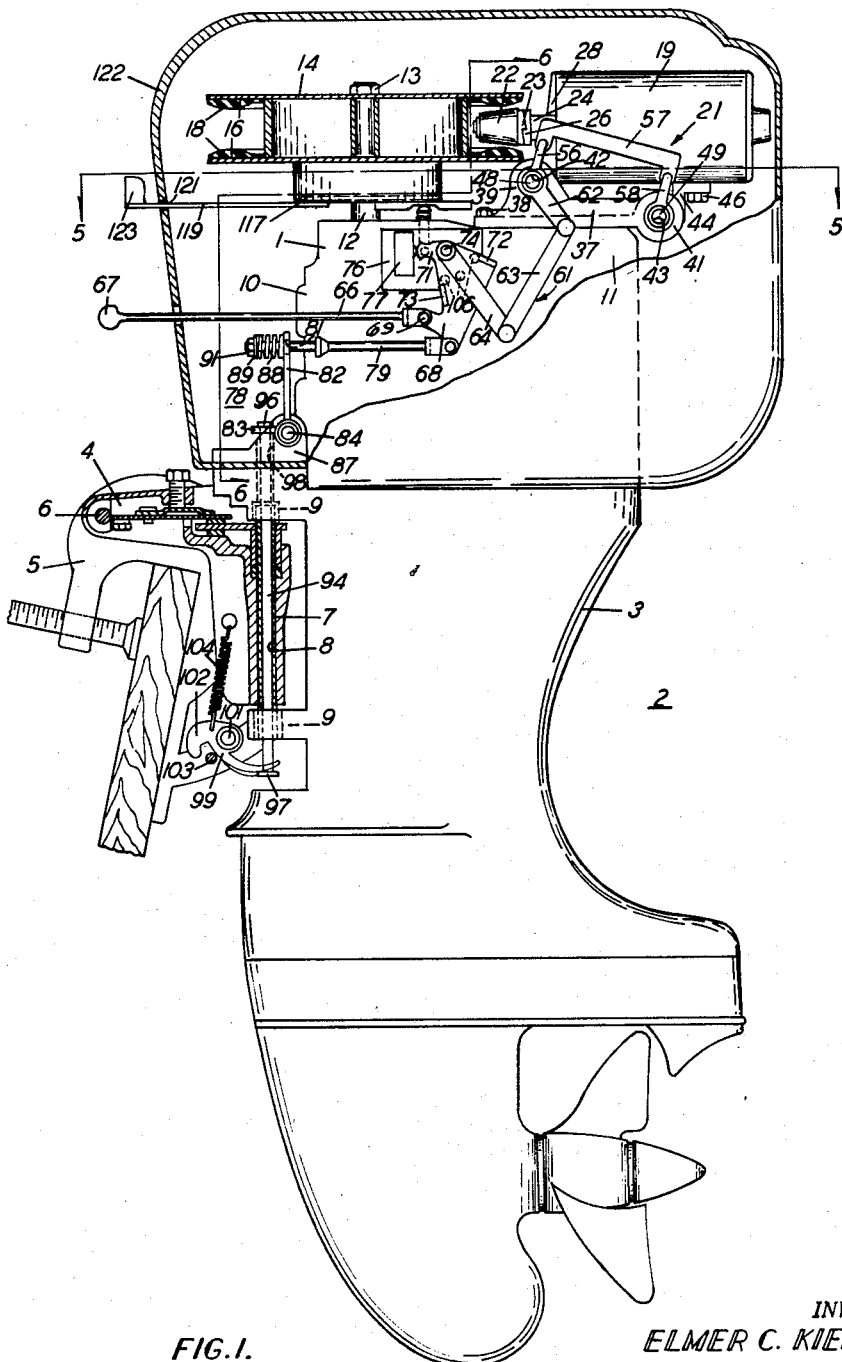
Fig. 1 is a side elevation view of an outboard motor having a portion sectioned to show an internal combustion engine with the starting mechanism of the invention in an ignition off position and the starter motor out of engagement with the starter pulley.

As shown in the drawings, a preferred embodiment of this invention is illustrated as applied to an engine shown as a power head 1 of an outboard motor 2 mounted on a drive shaft housing 3.

Attachment means comprising a clamp bracket 5 and a swivel bracket 4 pivotably connected together by means of a horizontal bolt 6 are provided for attaching the outboard motor 2 pendently to the transom of a boat, not shown. The swivel bracket 4 is further vertically pivotably mounted to the housing 3 by means of a longitudinal rod or pivot pin 7 passing through a suitable opening 8 in the swivel bracket 4 and engaging bushings 9 in the housing.

The power head 1 shown in the drawing includes a crankcase 10 secured to a cylinder block 11 and carrying a crankshaft 12. Secured to the upper end of the crankshaft 12 by means of a key, not shown, and a nut 13 is a pulley 14 having pulley faces 16 forming a peripheral groove that is substantially U-shaped in cross section. The pulley 14 is provided with annular friction rings 18 of suitable material such as rubber bonded to the faces 16 of the pulley 14 by well known means to provide a surface having a high coefficient of friction.

A starting mechanism for positively rotating the pulley 14 in either direction comprises essentially an electric starter motor 19 having the proper torque characteristics coupled with a link mechanism 21 and switching arrangement for starting the motor 19 and moving the motor selectively into engagement with one of the friction rings 18 of the pulley 14. Means are also provided coacting with the link mechanism 21 for positively locking the drive shaft housing 3 of the outboard motor 2 to the clamp bracket 5 during reverse operation.

Figure 6:
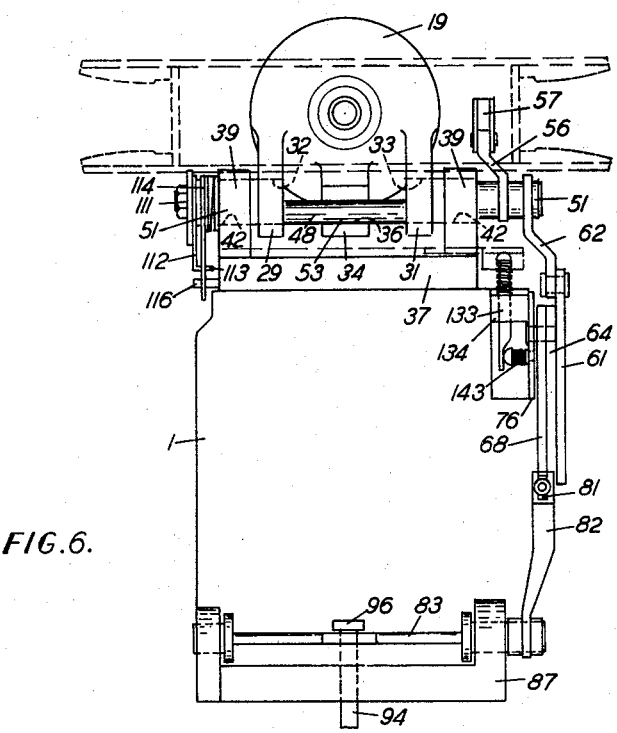
Fig. 6 is an enlarged section view taken on line 6—6 of Fig. 1.
Figure 7:
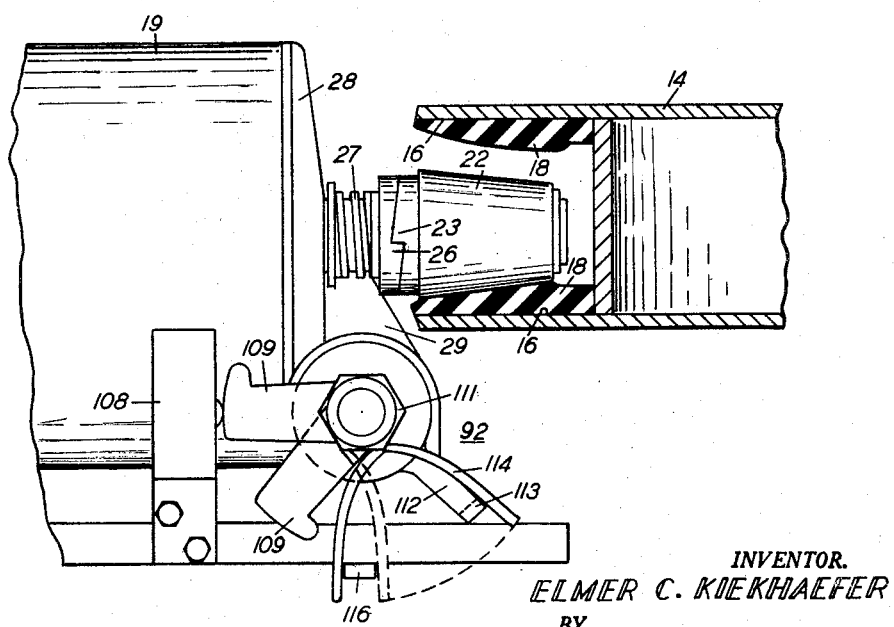
Fig. 7 is an enlarged fragmentary elevation view of the starter motor switch and centering mechanism of the invention.
Figure 11:
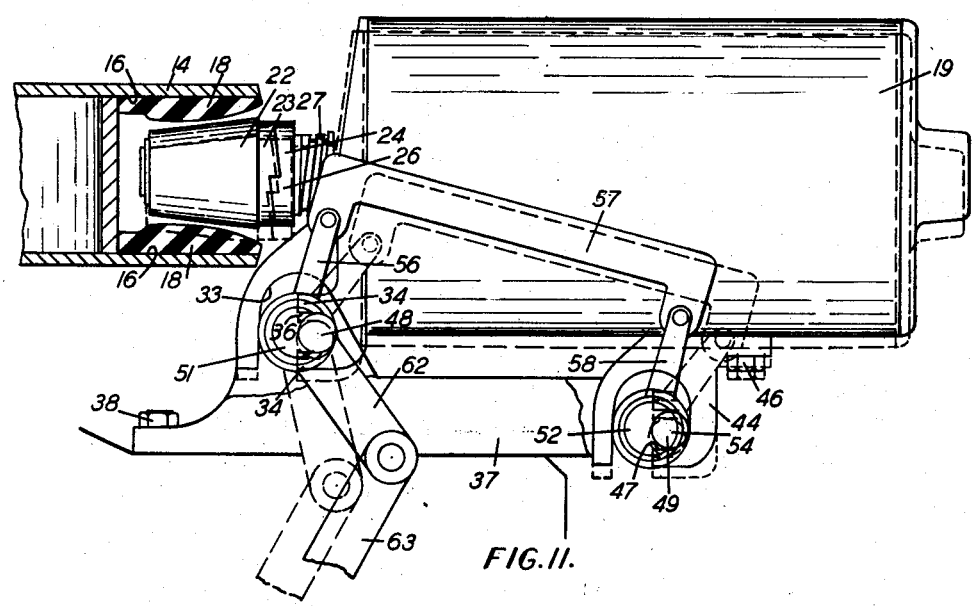
Fig. 11 is an enlarged fragmentary view partly in section of a portion of the starting mechanism shown in two positions, one dotted, for placing the starter motor into and out of engagement with the pulley.
Figure 12:
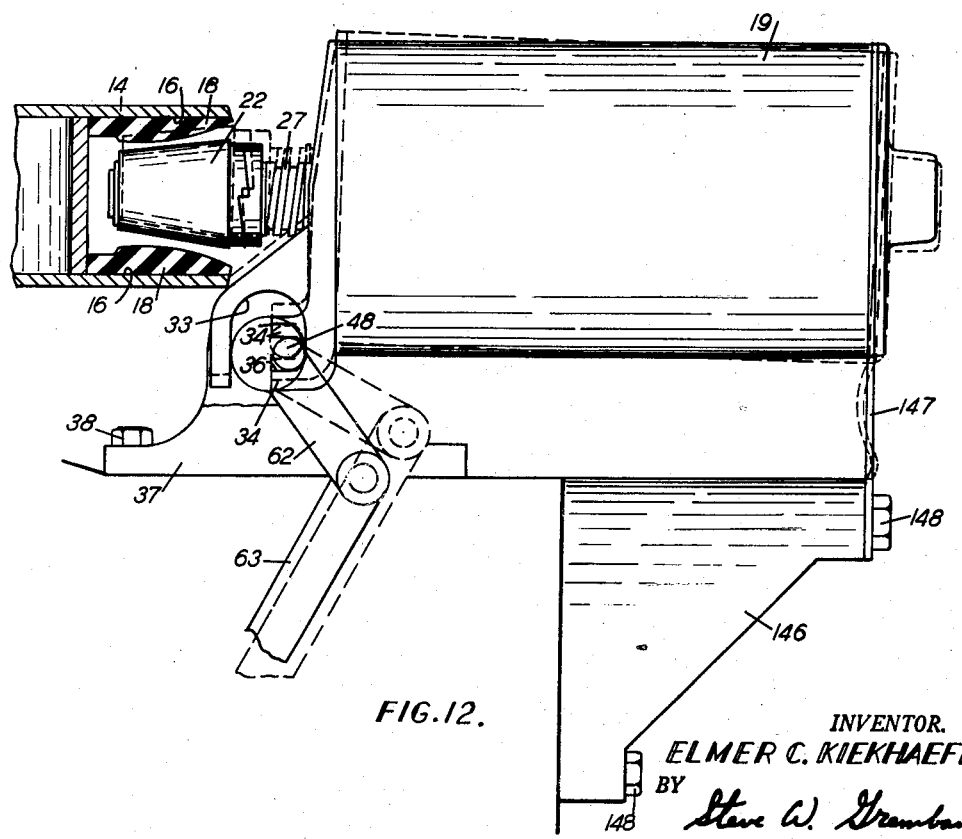
Fig. 12 is an enlarged fragmentary view similar to Fig. 11 showing two positions, one dotted, of an alternative structure for the structure of Fig. 11 for placing the starter motor into or out of engagement with the pulley.

The starter motor 19 is provided with a frustum shaped friction element 22 mounted on the starter motor shaft for rotation therewith and constructed of a wear-resistant material, such as rubber. The friction element 22 is provided with gear teeth 23 engageable by a clutch member 24 having corresponding clutch teeth 26 biased into engagement with the teeth 23 of the friction element 24 by means of a spring 27 as shown in Fig. 7. The clutch member 24 forms a safety device to protect the starter motor 19 from damage by ratcheting when the friction element 22 is positively rotated in one direction to start the internal combustion engine 1, and upon starting thereof, the pulley 14 of the internal combustion engine 1 rotates at an angular velocity exceeding that of the friction element 22. The starter motor 19 has an annular end cap 28 mounted on the front end thereof forming a motor support member. The end cap 28 has a pair of spaced flanges 29, 31 as shown in Figs. 6 and 7 projecting from the cap 28 and cooperating therewith to form inverted U-shaped recesses 32, 33 respectively as shown in Figs. 11 and 12. Intermediate the recesses 32, 33, the cap 28 has a projection 34 forming a U-shaped groove 36 substantially at right angles to the U-shaped recesses 32, 33.

A mounting bracket 37 is fastened to the power head 1 by means of nuts 38, only one of which is shown, and has the opposite ends thereof form a pair of laterally spaced transverse flanges 39, 41 having openings 42, 43 respectively therein with the openings 42 in flanges 39 in register with one another and the openings 43 in flanges 41 in register with one another. A bracket 44 is mounted by means of a bolt 46 to the under side of the starter motor 19 intermediate the ends thereof and has one end of the bracket 44 forming a U-shaped groove 47 as shown in Fig. 11 parallel to groove 36. A pair of cam means 48, 49 each having cylindrical end portions 51, 52 respectively and a cylindrical intermediate portion 53, 54 respectively having their axis offset from the axis of the end portions 51, 52 are inserted through the openings 42, 43 of the mounting bracket 37 with the intermediate portions 53, 54 mating with the corresponding grooves 36, 47 of the projection and bracket respectively. The cam means 48, 49 are connected together by link mechanism 21 comprising pivotably connected link elements 56, 57 and 58 whereby angular movement of cam member 48 causes a corresponding movement of cam member 49.

The starter motor 19 is moved vertically up or down with its longitudinal axis at all times maintained perpendicular to the axis of the crank shaft 12 by the link mechanism 61 having one end of a link element 62 mounted on one of the cam members 48 for rotating same. The lin mechanism 61 comprises additional link elements 63, 64 pivotably connected to one another at their ends thereof and actuable by a lever 66 having a knob 67 at one end and the other end attached to lost motion means shown as a switch actuating member 68 at 69. The switch actuating member 68 comprises a plate member having a cam 71 and two transverse projections 72, 73 laterally spaced from one another. One of the link elements 64 and the switch actuating member 68 are pivotably mounted about a pivot 74 provided on a plate 76 which is secured to the power head 1 by any known means. The link element 64 is disposed between the projections 72, 73 of the switch actuating member 68 to provide some lost motion therebetween before either of the projections 72, 73 engage the link element 64. The cam portion 71 of member 68 normally rests against the switch button of ignition switch 77 mounted on plate 76 and thereby maintains the ignition circuit open. Upon actuation of member 68 cam portion 71 moves from engagement with the switch button of switch 77 to close the ignition circuit. The switch member 68 further actuates a reverse tilt lock mechanism 78 as shown in Figs. 1 through 5 which has a rod member 79 having one end pivotably mounted to the switch actuating member 68. The other end of the rod member 79 has a threaded portion passing through an opening 81 provided in a bracket 82 having one end secured to a lift member 83 which in turn has cylindrical end portions 84 pivotably mounted in openings 86 shown dotted in Fig. 5 provided by a base member 87 secured to the power head 1 as shown in Fig. 5. A spring 88, washer 89 and nut 91 are secured to the threaded end of the rod 79 with one end of the spring 88 engaging the bracket 82 so that movement of the switch actuating member 68 to start the engine for reverse operation of the outboard motor 2 causes the rod 79 and bracket 82 to actuate the reverse tilt lock mechanism 78. The spring 88 is compressed during the movement of the rod 79 so that movement of the starter motor 19 by a centering mechanism 92 shown in Fig. 7 to be explained hereinafter to an inoperative position allows the spring 88 to expand and exert pressure against the bracket 82 to maintain the reverse lock position. The spring 88 further takes up any slack in the starter mechanism caused by wear of the friction element 22 and friction rings 18. The lift member 83 has a slot 93 as shown in Fig. 5 adapted to receive an elongated pin 94 having a flange portion 96, 97 at each end thereof. Upon movement of the lift member 83 upwardly about its pivot, the lift member 83 engages flange 96 of the pin 94 to cause the pin to be moved vertically upwardly. The pin 94 is disposed within an opening 98 shown dotted in Figure 1 and provided in the base member 87 and the hollow pivot pin 7 of the swivel bracket 4. The other end of the pin 94 is slidable within a slot provided in one end of a lock member 99 pivotably mounted to the swivel bracket 4. Movement of the pin 94 upwardly causes the lock member 99 to be rotatably moved about its pivot 101 causing a finger 102 provided on the other end thereof to engage a pin 103 carried by the clamp bracket 5. The lock member 99 is disengaged upon downward movement of the pin 94 by means of a spring 104.

Figure 3:
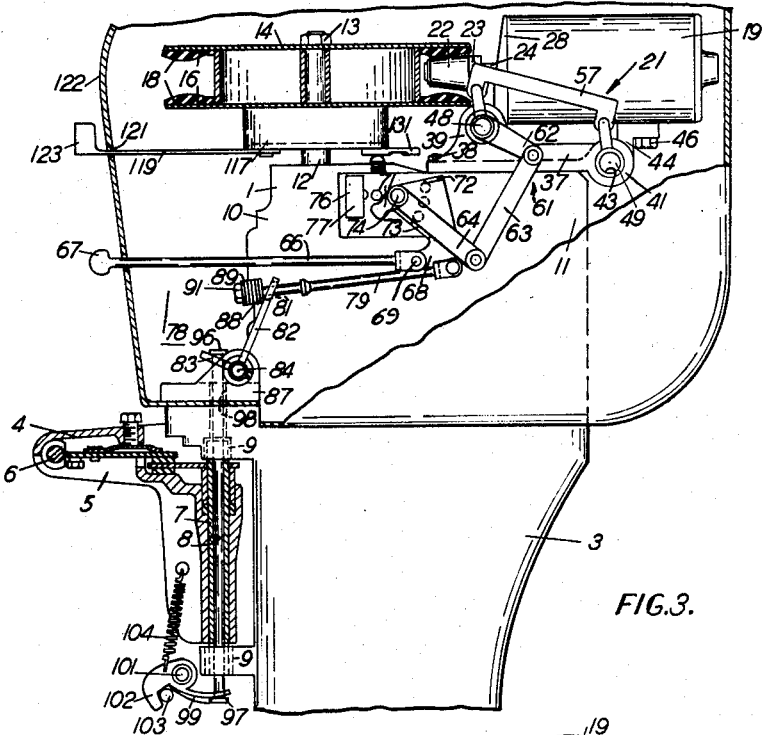
Fig. 3 is a view similar to Fig. 2 with the starting mechanism in a reverse starting position showing the starter motor in engagement with the pulley to start the engine in a counter-clockwise direction.
Figure 2:
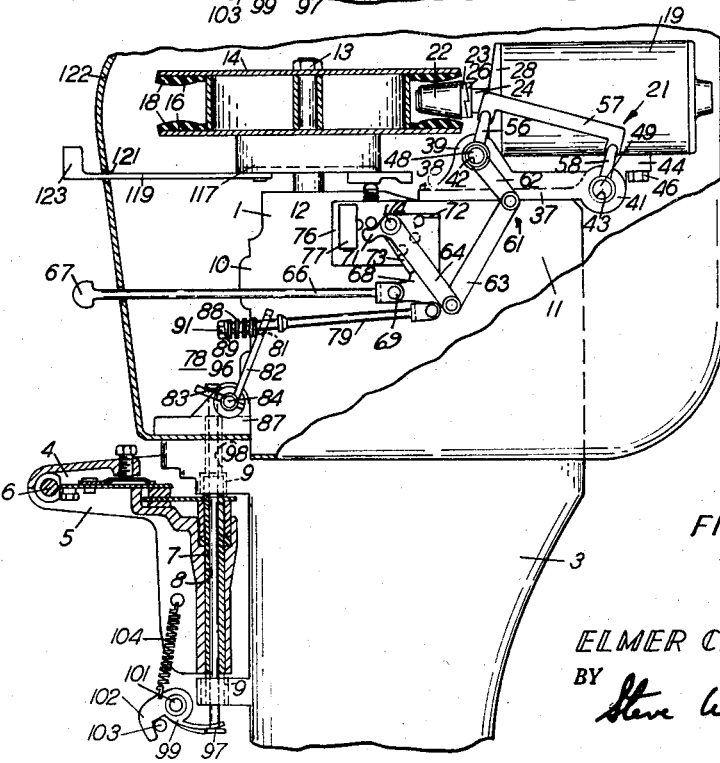
Fig. 2 is a side elevation view of a portion of an outboard motor showing the starting mechanism in a reverse ignition on position and the starter motor out of engagement with the starter pulley.
Figure 4:
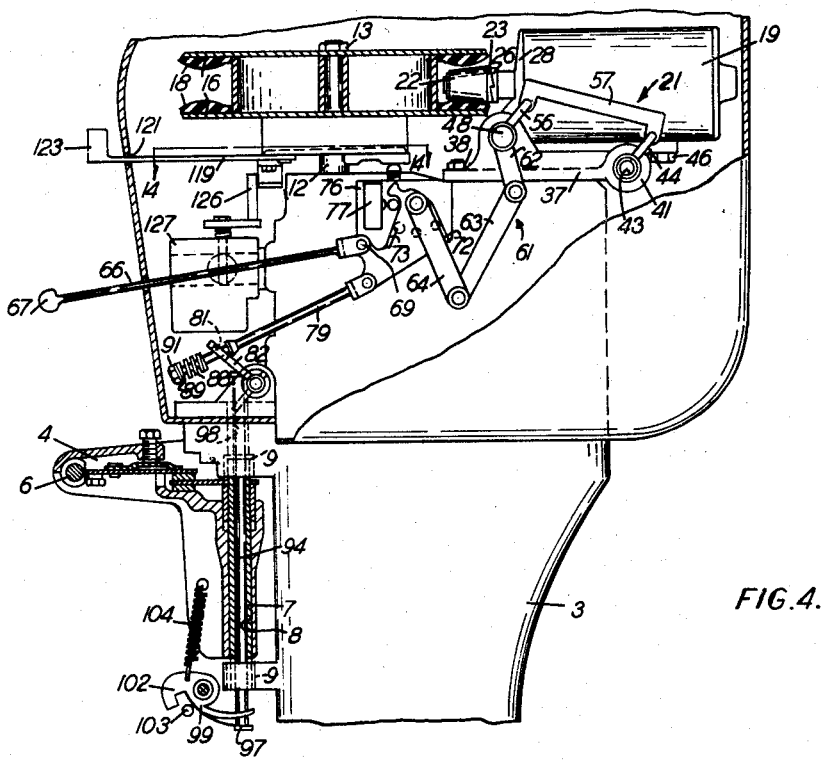
Fig. 4 is a view similar to Fig. 3 with the starting mechanism in a forward starting position showing the starter motor in engagement with the pulley to start the engine in a clockwise direction.
Figure 5:
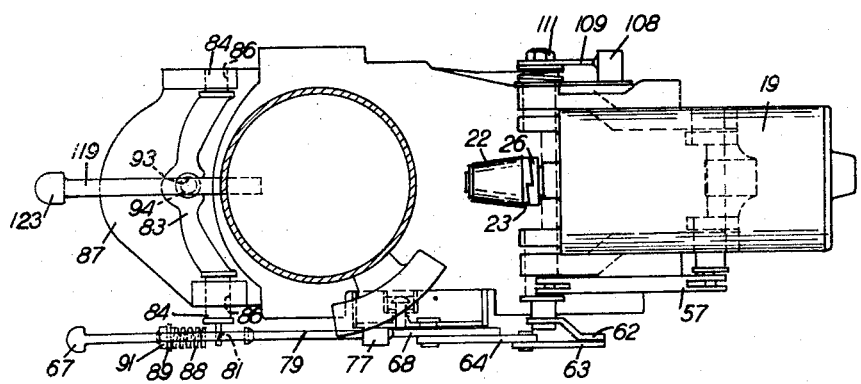
Fig. 5 is an enlarged section view taken on line 5—5 of Fig. 1.

The switch actuating member 68 is provided with a detent system shown dotted in Figs. 1 through 4 comprising a plurality of indentations 106 adapted to engage a spring urged steel ball, not shown, carried by the plate 76. The indentations 106 are preferably arranged to selectively lock the switch actuating member 68 in the following positions: 1. Ignition off where the cam member 71 of the switch actuating member 68 depresses the switch button of ignition switch 77 to open the ignition circuit as shown in Figure 1; 2. Forward ignition on position where projection 72 of the switch actuating member 68 engages the link element 64 as shown in Fig. 4; and 3. Reverse ignition on position where the other projection 73 of the switch actuating member 68 engages the link element 64 as shown in Figs. 2 and 3.

The starter motor 19 has a starter solenoid 107 shown in Fig. 8 connected thereto controlled by a starter solenoid switch 108 which is normally open and actuable by a pair of arms 109 movably secured to one end of cam member 48 by means of a screw 111 as shown in Fig. 7. The switch 108 when in the open position is positioned intermediate the arms 109 and the angular movement required of the cam member 48 to cause one of the arms 109 to actuate the switch 108 is controlled by the positioning of the two arms 109. The further the arms 109 are spaced from one another, that is, the greater the included angle formed by the axis of the arms, the further the starting mechanism must be angularly moved before the switch 108 is closed by the arms 109 to actuate the starter solenoid 107. Also securely mounted to the cam member 48 is the centering mechanism 92 comprising an elongated rectangular projection 112 having a lip 113 at one end thereof. A loop centering spring 114 has the loop thereof disposed about the cam member 48 with the opposite ends of the spring 114 disposed to engage opposite sides of a stop member 116 provided on the power head 1. The projection 112 is secured to the cam member 48 with the lip 113 interposed between the ends of the spring 114. Upon movement of the cam member 48 by means of the aforementioned link mechanism 61, the arms 109 and projection 112 which are firmly secured thereto are moved rotationally with the cam member 48 until one of the arms 109 actuates the starter solenoid switch 108 starting the motor. The lip 113 of the projection 112 causes one end of the spring 114 to be moved therewith while the other end is retained by the stop member 116 subjecting the spring to torsional movement. Upon release of the lever 66 of the link mechanism 61, the spring 114 urges the cam member 48 and starter motor 19 to its neutral position wherein the friction element 22 is out of frictional engagement with either ring 18 of the pulley 14.

Figure 14:
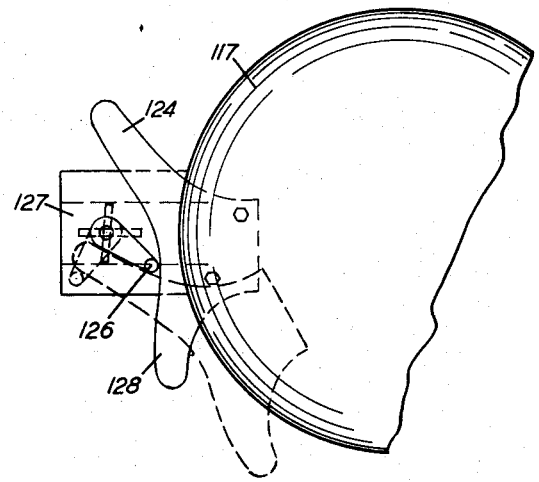
Fig. 14 is a fragmentary section view taken along line 14—14 of Fig. 4 showing the throttle and spark advance mechanism for operation of the engine in a clockwise and counter-clockwise direction.

The throttle and spark advance of the engine 1 is accomplished by rotatably moving a stator 117 carrying a conventional make and break switch mechanism $S_1$ as shown in Fig. 8 by means of an arm 119 mounted to the stator 117 and extending through a slot 121 in a cowl 122 encasing the engine 1. The arm 119 and stator 117 may be rotatably moved by means of a handle 123 secured to the arm 119, and movement in one direction advances the spark for engine operation in that direction and causes a cam 124 mounted on the stator 117 as shown in Figs. 4 and 14 to engage a lever 126 connected to a carburetor 127 to simultaneously increase the engine speed. Movement of the stator 117 in the opposite direction for engine operation in the opposite direction causes another cam 128 to engage the lever 126 to increase the engine speed simultaneously with advance of the spark. An ignition lock mechanism 129 shown in Figs. 9 and 10 wherein the ignition cannot be turned off to stop the engine 1 when the throttle is advanced causing the engine to operate above a predetermined r.p.m. comprises a plate member 131 mounted to the stator 117 for movement therewith as shown in Figs. 1, 9 and 10. The plate member 131 has a cam surface 132 adapted to engage a plunger 133 slidably disposed within a bracket 134 mounted on the engine 1 to cause the plunger 133 to reciprocally move up or down. One end of the plunger 133 has a cap 136 which serves as a cam follower and is urged against the cam surface 132 by means of a spring 137 interposed between the cap 136 and the bracket 134. The plunger 133 has an elongated slot 138 shown dotted near the opposite end thereof through which the threaded shank of a cam element 139 extends and is secured to the plunger 133 by means of a nut 141. The cam element 139 upon movement of the plunger 133 engages a lock member 142 having one end urged by a spring 143 into engagement with the cam element 139 and the other end extending through an opening 144 provided in the plate 76. Movement of the handle 123 and stator 117 in either direction causes the cam surface 132 of the plate member 131 to reciprocally move the plunger 133. This plunger movement causes the cam element 139 to correspondingly reciprocate the lock member 142 through the opening 144 in the plate 76 to provide a stop to prevent movement of cam 71 on the switch actuating member 68 from an ignition on position to an ignition off position. The speed of the engine 1 at which the locking member 142 becomes effective to prevent opening of the ignition switch 77 is controlled by adjustably varying the position of the cam element 139 within the slot 138 of the plunger 133 by means of the nut 141. Controlling the speed at which the ignition switch 77 may be opened is particularly advantageous in an outboard motor since it eliminates the possibility of swamping the boat which would likely occur if the engine 1 were suddenly stopped with the boat moving through the water at a high rate of speed.

In the operation of applicant's invention, the aforementioned centering mechanism 92 returns and normally maintains the starter motor 19 in the neutral position shown in Figure 1 with its friction element 22 out of contact with either ring 18 of the pulley 14, and places the starter solenoid switch 108 in an inoperative position. The stator 117 of the engine 1 is initially positioned to place the ignition lock mechanism 129 in an unlocked or inoperative position as shown in Figs. 1 and 10. The switch actuating member 68 is initially in an ignition off position shown in Figure 1 with the cam 71 depressing the ignition switch button and covering the opening 144 in the plate 76 to limit the movement of the stator 117 in a direction to advance or retard the spark. To start the internal combustion engine 1 from this initial position so that the pulley 14 and crankshaft 12 operate in a clockwise direction, that is for propelling a boat in a forward direction in the case of an outboard motor, the lever 66 is pulled outwardly by means of the knob 67 causing the switch actuating member 68 to be pivotably moved about the pivot 74 as shown in Fig. 4. Movement of the switch actuating member 68 causes the cam 71 to release the ignition switch button thereby closing the ignition switch 77 so that current will flow from the battery through the primary of the coil as the engine is cranked as shown in Fig. 8. Continued pivotal movement of the switch actuating member 68 causes the member to assume the forward ignition on position where the projection 72 thereon engages the link element 64. Further pivotal movement of the switch actuating member 68 causes the link element 64 to move which in turn transmits pivotal movement to the cam member 48. The movement of the cam member 48 is transmitted to the other cam member 49 by means of the link elements 56, 57 and 58 causing the starter motor 19 to be moved downwardly with its axis at all times perpendicular to the crankshaft axis until the friction element 22 is in contact with the lower ring 18 of the pulley 14. The cam 48 movement further causes the button of the starter solenoid switch 108 to be depressed by means of one of the arms 109 as shown in Fig. 7, causing the starter motor 19 to be operative as the friction element 22 contacts the friction ring 18 of the pulley 14. The knob 67 and lever 66 are maintained in this position until the internal combustion engine 1 has been started, whereupon the knob 67 is released and spring 114 of the centering mechanism 92 urges the switch actuating member 68 to assume the forward ignition on position and the starter motor 19 to return to the neutral position with the friction element 22 out of contact with the lower friction ring 18 of the pulley 14 and the solenoid switch 108 in the open position.

To start the internal combustion engine 1 in a counterclockwise direction, that is for driving a boat in a reverse direction in the case of an outboard motor, the movement of the starter mechanism is opposite or the reverse of the movement as described for forward operation as shown in Fig. 3. In addition, however, pivotal movement of the switch actuating member 68 causes the rod 79 to be moved rearwardly, which movement is in turn transmitted to the spring 88, bracket 82, lift member 83, pin 94 and reverse lock member 99 causing the finger 102 thereon to engage the pin 103. When the switch actuating member 68 is returned by the centering mechanism 92 to the reverse ignition on position, the reverse lock member 99 is maintained in the lock position by means of the expansion of the spring 88 as shown in Fig. 2.

Figure 13:
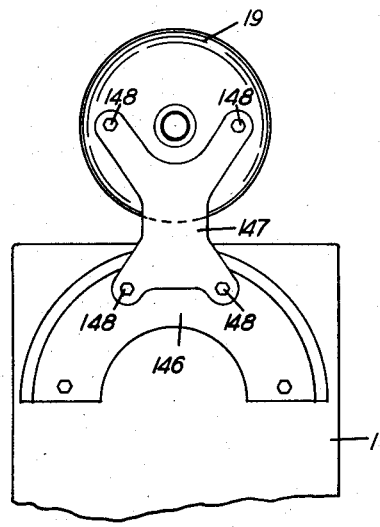
Fig. 13 is a reduced scale rear elevation view of Fig. 12 showing the plate spring member connecting the starter motor to the engine bracket.

In Figs. 12 and 13 applicant shows a modification of the portion of the starting mechanism that places the starter motor 19 into and out of engagement with the pulley 14. The starting mechanism differs from the previously described mechanism in that the starter motor 19 is pivotably mounted to an engine bracket 146 by means of a plate spring member 147 having ends secured to the bracket 146 and the starter motor 19 by means of studs 148.

Various embodiments of the invention may be employed within the scope of the appended claims.

It is claimed and desired to secure by Letters Patent:

1. In an internal combustion engine having a crankshaft, the combination of: a first member mounted on said crankshaft for rotation therewith, a starter motor mounted on said engine and being responsive to switch means, a second member mounted on the shaft of said motor for rotation therewith and adapted to rotatively drive said first member, and means for moving one of said members in one direction into frictional engagement with said other member, said means further actuating said switch means whereby said engine is rotated in a clockwise direction for starting same, said means when moving one of said members in the opposite direction into frictional engagement with said other member causing said switch means to be actuated whereby said engine is rotated in a counterclockwise direction for starting same.

2. In an internal combustion engine having a crankshaft, the combination of: a V-shaped pulley forming spaced faces mounted on the crankshaft of said engine for rotation therewith, a starter motor mounted on said engine and having a shaft disposed transversely to the axis of said crankshaft, a friction element mounted on said motor shaft for rotation therewith and interposed between said pulley faces in a neutral position, ignition switch means for said engine, motor switch means for starting said motor, and actuating means for moving said motor and friction element in one direction with said friction element engaging one of the faces of the pulley, said actuating means further actuating said ignition and said motor switch means whereby said engine is rotated in a clockwise direction for starting same, said means when moved in the opposite direction moving said friction element into engagement with said other face of said pulley and actuating said ignition and motor switch means whereby said engine is rotated in a counter-clockwise direction.

3. The combination of claim 2 wherein the pulley faces have a friction material such as rubber mounted thereon.

4. In an outboard motor wherein a reversible internal combustion engine is drivingly connected to a propeller and the motor is pivotable on a horizontal axis about a support bracket for securing said motor to the transom of a boat, the combination of: a first member mounted on the crankshaft of said engine for rotation therewith, a starter motor mounted on said outboard motor switch means provided on the outboard motor for starting the starter motor, a second member rotatively mounted on said starter motor and adapted to engage and rotatively drive said first member, actuating means carried by the outboard motor for moving one of said members into engagement with said other member and further actuating said switch means to start the starter motor whereby said engine crankshaft is selectively rotated in a clockwise or counter-clockwise direction to start said engine to drive said propeller for propelling the boat in a forward or reverse direction, and lock means carried by the outboard motor adjacent to the support bracket and actuable by said actuating means to secure the outboard motor to said support bracket when said engine crankshaft and said propeller are rotated to propel the boat in a reverse direction.

5. The combination of claim 4 wherein said actuating means includes a member pivotably mounted on said engine, and said lock means includes a rod member having one end thereof secured to said last named member with the other end of said rod member actuating a support bracket engaging element on the outboard motor to secure the outboard motor to said support bracket.

6. A starter mechanism for a reversible internal combustion engine having a crankshaft comprising: a first member mounted on said crankshaft for rotation therewith, a starter motor mounted on said engine, switch means provided on the engine for starting the starter motor, a second member mounted on the shaft of said starter motor for rotation therewith and adapted to rotatively drive said first member to crank the engine, actuating means carried by the engine for moving one of said members into engagement with the other of said members and actuating said switch means to start the starter motor whereby said engine crankshaft is rotated to start said engine, an ignition switch carried by said engine, a switch actuating member mounted on said engine and adapted to actuate the ignition switch, and a lost motion connection provided between said switch actuating member and said actuating means whereby the ignition switch is actuated before said actuating means for moving the first and second members into engagement.

7. The combination of claim 6 wherein said lost motion connection includes a pair of laterally spaced projections provided on said switch members, said projections being adapted to selectively engage a portion of the actuating means for moving the first and second members into engagement pivotably disposed between said projections.

8. In an outboard motor wherein a reversible internal combustion engine is drivingly connected to a propeller, and a crankshaft for said engine, a first member mounted on the crankshaft of the engine for rotation therewith and having a pair of opposed surfaces, a starter motor mounted on said engine switch means provided on the engine for starting the starter motor, a second member mounted on said starter motor and adapted to rotatably drive said first member, means comprising a link mechanism and cam means mounted on said engine for moving the second member on said starter motor into selective engagement with one of the pair of opposed surfaces on the first member on the crankshaft whereby the engine crankshaft is rotated to start the engine and drive the propeller selectively in one of two possible directions, and an arm mounted on said cam means for actuating the switch means whereby the starter motor becomes operative substantially simultaneously as the second member engages the first member.

9. In an outboard motor wherein a reversible internal combustion engine is drivingly connected to a propeller, a crankshaft for said engine, a first member mounted on the crankshaft of the engine for rotation therewith, a starter motor mounted on said engine and being responsive to switch means, a second member mounted on said starter motor and adapted to rotatably drive said first member, means comprising a link mechanism and first and second cam means mounted on said engine, said first and second cam means being connected by a portion of said link mechanism whereby rotative movement of the first cam means is transmitted to the second cam means, and means connected to the starter motor and actuated by the first and second cam means whereby movement of said link mechanism and the first and second cam means selectively raises or lowers the starter motor with its axis at all times being maintained perpendicular to the engine crankshaft to place the second member in driving engagement with the first member and thereby crank the engine and drive the propeller selectively in one of two possible directions.

10. In an outboard motor wherein a reversible internal combustion engine is drivingly connected to a propeller, a crankshaft for said engine, a first member mounted on the crankshaft of the engine for rotation therewith and having a pair of opposed surfaces, a starter motor, a second member mounted on one end of said starter motor and adapted to rotatably drive said first member, a spring plate member secured to the opposite end of the starter motor from said second member and to the engine, respectively, and means comprising a link mechanism and cam means mounted on said engine to move the starter motor pivotably about said spring plate member to move the second member on said starter motor into selective engagement with one of the pair of opposed surfaces on the first member on the crankshaft whereby the engine crankshaft is rotated to start the engine and drive the propeller selectively in one of two possible directions.

11. A starter mechanism for a reversible internal-combustion engine having a crankshaft and comprising, a starter motor mounted on said engine and having a shaft, a first member mounted on said shaft for rotation therewith, a second member mounted on said engine crankshaft for rotation therewith, said motor together with said first member normally being disposed in a neutral position out of contact with said second member, actuating means including a rotatable cam member on the engine to effect movement of the motor out of the neutral position to place the first member into driving engagement with said second member to crank the engine for starting, a projection extending radially from the cam member and rotating therewith, a stop provided on said engine and being in substantial alignment with said projection when the starter motor is in the neutral position, and a loop spring disposed on said cam member and having extended end portions positioned on opposite sides of the projection and stop, said spring being torsionally wound up upon rotation of the cam member to start the engine as one end of the spring is moved by the projection and the other end is retained by the stop, and upon release of the cam member after the engine is started said spring returns the starter motor to its neutral position.

12. In an outboard motor wherein a reversible internal combustion engine is drivingly connected to a propeller and the motor is pivotable about a support bracket for securing the motor to the transom of a boat, a first member mounted on the crankshaft of the engine for rotation therewith and having a pair of opposed surfaces, a starter motor mounted on said outboard motor, switch means carried by the outboard motor for starting the starter motor, a second member mounted on said starter motor and adapted to selectively engage one of the pair of surfaces on said first member and drive the same selectively in accordance with forward and reverse operation of the outboard motor, an ignition switch mounted on the engine, actuating means pivotally mounted on the engine and adapted to selectively actuate the ignition switch for forward or reverse operation of the outboard motor upon coresponding operation of the actuating means, corresponding operation of said actuating means further moving the second member into selective engagement with the first member and further actuating said starter motor switch means after selective actuation of the ignition switch whereby the engine crankshaft is selectively rotated to start the engine and drive the propeller for propelling the boat in the desired direction, and lock means carried by the outboard motor for locking the motor to the support bracket and including a rod member pivotally connected to and movable by said actuating means and an element pivotally mounted on the outboard motor and actuable by said rod member, said element being actuated by said rod to effect securement of the outboard motor to the support bracket when the actuating means is actuated to the position corresponding to reverse operation of the outboard motor.

13. The combination of claim 12 wherein the actuating means is selectively movable into a reverse ignition on position and upon further movement in the same direction into a reverse starting position, and the end of the rod member opposite from the actuating means is threaded and extends through a slot provided in the element actuable by said rod member, and a spring is interposed between said element and a nut threaded on the end of said rod member, said rod member and spring actuating said element to effect securement of the outboard motor to the support bracket when the actuating means is moved into the reverse ignition on position, said spring being compressed to maintain securement between the outboard motor and the support bracket and providing lost motion between the rod member and the element when the actuating means continues movement to the reverse starting position.

14. In an internal-combustion engine operable over a range of r.p.m. in response to a movable means adapted to control the throttle and spark advance of the engine, an ignition switch mounted on the engine, actuating means carried by the engine and adapted to actuate the ignition switch to an ignition on position, and means operable by the movable means and engageable with said actuating means to lock the actuating means in the ignition on position upon movement of the movable means a given amount to a position corresponding to engine speed over a predetermined r.p.m.

15. In an internal-combustion engine operable over a range of r.p.m. in response to a movable means adapted to control the throttle and spark advance of the engine, in ignition switch mounted on the engine, a switch actuating member engaging said switch to maintain the switch and the circuit thereof open in an ignition-off position, actuating means connected to the switch actuating member whereby said member is moved to a switch disengaging position to close the switch and the circuit thereof to provide an ignition on position, cam means carried by the movable means and operable therewith, and plunger means engageable with said cam means and in turn actuating stop means engageable with the switch actuating member to lock said member in the ignition-on position upon movement of the movable means a given amount to a position corresponding to engine speed above a predetermined r.p.m.

16. In an outboard motor wherein an engine is selectively operable to drive a boat in a forwardly and rearwardly direction, said engine being further operable over a range of r.p.m. in either direction in response to a movable control means for the throttle and spark advance of the engine, an ignition switch mounted on the engine, actuating means carried by the engine and adapted to selectively actuate the ignition switch to a forward ignition on position and rearward ignition on position, and means operable by the control means and engageable with said actuating means to lock the actuating means in either of the ignition on positions upon movement of the control means a given amount to a position corresponding to engine speed above a predetermined r.p.m.

17. An outboard motor having a propeller and pivotally mounted on a support bracket whereby the motor is secured to the transom of a boat and is free to pivot rearwardly therefrom when the propeller is rotated forwardly and is adapted to be locked against rearward pivoting when the propeller is reversed, comprising a reversible internal combustion engine which is selectively operable in opposite directions to drive the boat in forwardly and rearwardly directions and having a throttle and spark advance operable over a range of r.p.m. in either direction, a movable actuator mounted on the engine and adapted to control the throttle and spark advance of the engine, an ignition switch mounted on the engine, actuating means carried by the engine adjacent to the ignition switch and adapted to selectively actuate the ignition switch to a forward ignition on position and rearward ignition on position, interlock means carried by the engine and disposed between the actuator and said actuating means and being operable by the movable actuator and engageable with said actuating means to lock the actuating means in either of the ignition on positions upon movement of the movable actuator to a position corresponding to engine speed above a predetermined r.p.m., and lock means carried by the motor adjacent to the support bracket and operably connected to said actuating means whereby the motor is locked to the support bracket and against pivoting rearwardly thereon when the actuating means actuate the ignition switch to provide for rearward operation of the boat.

18. An outboard motor having a propeller and pivotally mounted on a support bracket whereby the motor is secured to the transom of a boat and is free to pivot rearwardly therefrom when the propeller is driving the boat forwardly and is adapted to be locked against rearward pivoting when the propeller is reversed, comprising a reversible internal combustion engine having a crankshaft drivingly connected to the propeller and operable in opposed directions and having a throttle and spark advance operable over a range of r.p.m., a movable actuator mounted on the engine and adapted to control the throttle and spark advance of the engine, a first member mounted on the crankshaft of the engine for rotation therewith and having a pair of opposed surfaces, a starter motor mounted on said outboard motor, switch means carried by the engine for starting the starter motor, second member mounted on said starter motor and adapted to selectively engage one of the opposed surfaces on the first member and drive same selectively in opposite directions in accordance with forward and reverse operation of the outboard motor, an ignition switch mounted on the engine, actuating means carried by the engine adjacent to the ignition switch and adapted to selectively actuate the ignition switch to a forward ignition on position and rearward ignition on position and thereafter move the second member into corresponding engagement with the first member and further actuating said starter motor switch means to energize said starter motor and crank the engine for starting the same selectively in either direction, interlock means carried by the engine and disposed between the actuator and said actuating means and being operable by the actuator and engageable with said actuating means to lock the actuating means in either of the ignition on positions upon movement of the actuator to a position corresponding to engine speed above a predetermined r.p.m., and lock means carried by the outboard motor adjacent to the support bracket and operably connected to said actuating means whereby the motor is locked to the support bracket and against rearward pivoting thereon when the actuating means actuates the ignition switch to provide for rearward operation of the boat.

19. An outboard motor adapted to reverse in its direction of propulsion without turning upon its steering axis and without interruption of the driving connection between the engine and propeller, comprising a dirigible motor unit having a reversible internal combustion engine, a clamp bracket on said motor unit adapted to mount said unit upon a boat, means to control the throttle feed of fuel to said engine, means to shift the spark timing for said engine to accommodate forward and reverse operation of the engine, means to start said engine selectively in either direction, and means to effect the selective actuation of said starter means when the shift position of said spark timing means and said fuel throttle control means are in the engine idling position.

20. An outboard motor adapted to reverse in its direction of propulsion without turning upon its steering axis and without interruption of the driving connection between the engine and propeller, comprising a dirigible motor unit having a reversible internal combustion engine, a clamp bracket on the motor unit adapted to mount said unit upon a boat and having a pivotal connection with a horizontal axis to a provide for rearward tilting of the motor unit, an underwater propulsion unit at the lower end of said dirigible unit and connected to said engine to be driven thereby, means to control the throttle feed of fuel to said engine, means to shift the spark timing for said engine to accommodate forward and reverse operation of the engine, means to start said engine selectively in either direction, means to effect the selective actuation of said starter means only when the shift position of said spark timing means and said fuel throttle control means are in the engine idling position, and lock means carried by the motor unit adjacent to the clamp bracket and actuated by said last named means to lock the motor unit against rearward tilting prior to starting of the engine in the reverse direction.

References Cited in the file of this patent
UNITED STATES PATENTS

| | | |
|---|---|---|
| 1,226,751 | Chryst | May 22, 1917 |
| 1,631,120 | Dyer | June 7, 1927 |
| 1,727,086 | Vastano | Sept. 3, 1929 |
| 1,843,272 | Evinrude | Feb. 2, 1932 |
| 2,635,576 | Kiekhaefer | Apr. 21, 1953 |